April 29, 1924.

A. R. FIREHAMMER

CHILD'S VEHICLE

Filed July 6, 1923

1,492,440

2 Sheets-Sheet 1

Arthur R. Firehammer
INVENTORS
BY Victor J. Evans
ATTORNEY

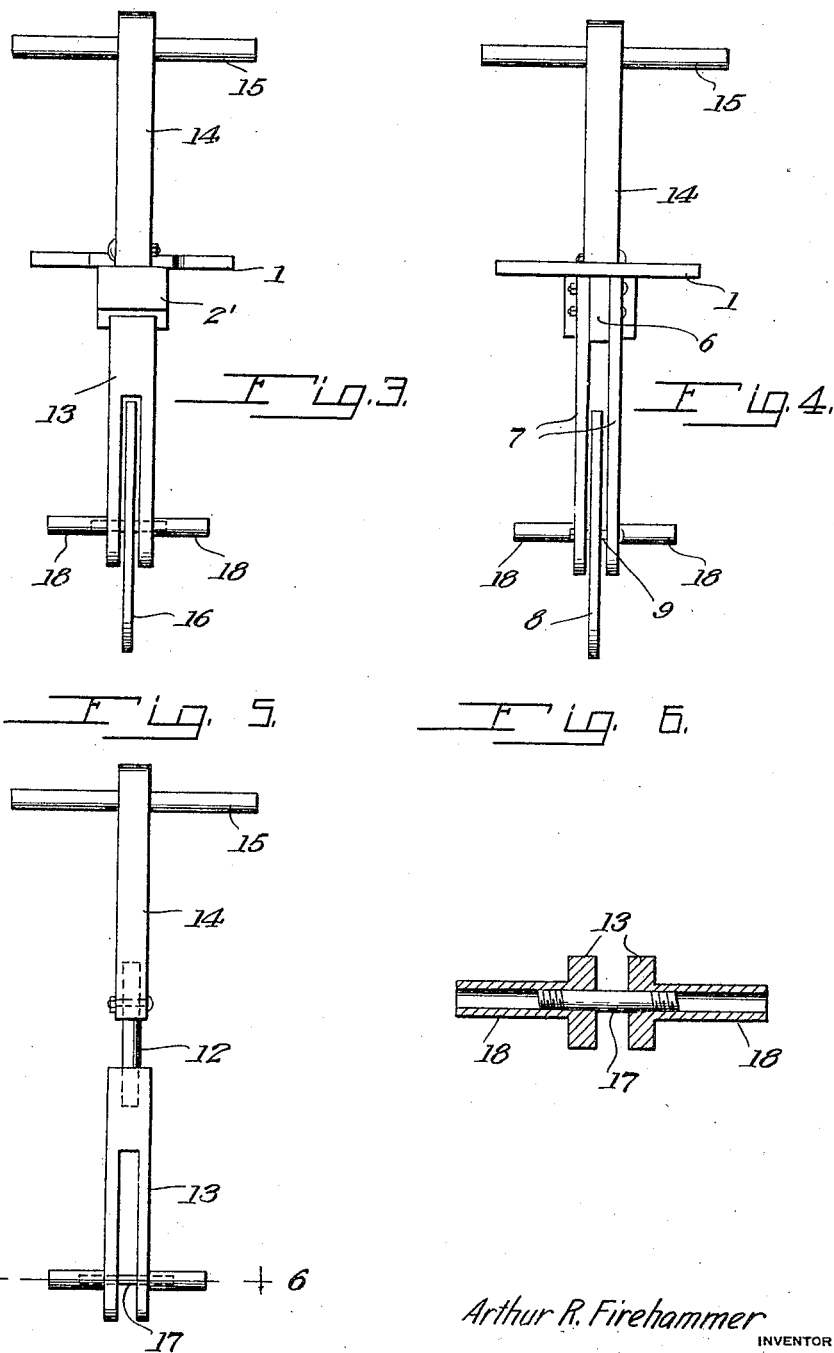

Patented Apr. 29, 1924.

1,492,440

UNITED STATES PATENT OFFICE.

ARTHUR R. FIREHAMMER, OF KAUKAUNA, WISCONSIN.

CHILD'S VEHICLE.

Application filed July 6, 1923. Serial No. 649,954.

*To all whom it may concern:*

Be it known that I, ARTHUR R. FIREHAMMER, a citizen of the United States, residing at Kaukauna, in the county of Outagamie and State of Wisconsin, have invented new and useful Improvements in Children's Vehicles, of which the following is a specification.

This invention relates to a wheeled toy, the general object of the invention being to provide a device upon which the child can sit and propel himself along by his feet, with means for adjusting the device so that it can be used by children of various sizes.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
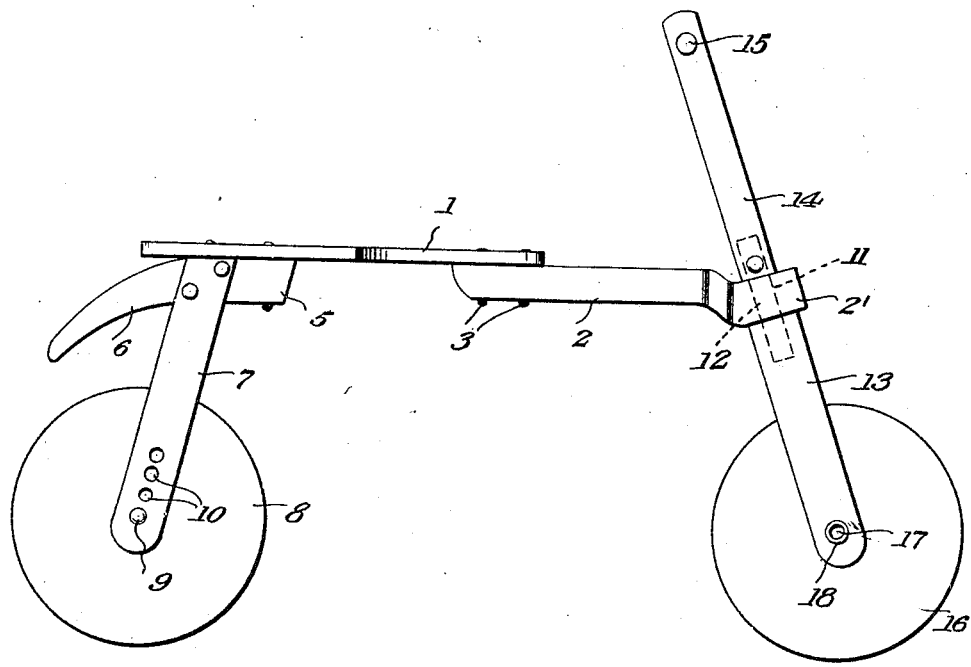
Figure 2:
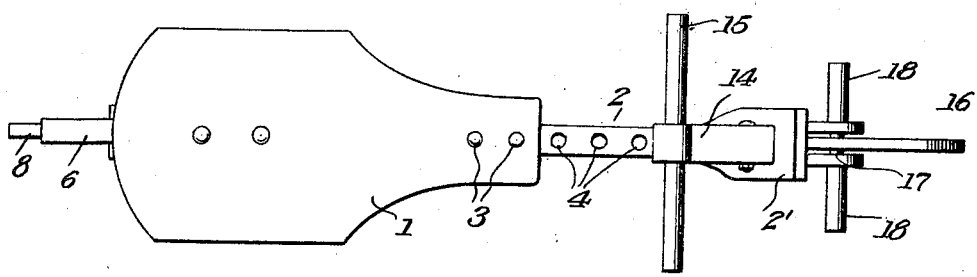

Figure 1 is a side view of the invention.
Figure 2 is a plan view.
Figure 3 is a view of one end.
Figure 4 is a view of the opposite end.
Figures 5 and 6 are detail views.

In these views 1 indicates the seat part and 2 a bar which is bolted to the reduced front end of the seat part by the bolts 3. The bar 2 is provided with a plurality of holes 4 for receiving the bolts so that the length of the device can be adjusted. A bracket 5 is bolted to the body of the seat part and said bracket has a curved tapered extension 6 at its rear end. A pair of depending pieces 7 are bolted to the brackets, one at each side thereof, and a wheel 8 is arranged between the lower ends of the pieces and is rotatably mounted on a shaft 9 which is carried by the pieces. The pieces are provided with a plurality of holes 10 for receiving the shaft so that the wheel can be adjusted towards and away from the bottom of the seat and thus permit the height of the device to be varied. The front end of the bar 2 is enlarged, as at 2' with the top and bottom faces flat to form shoulders. This part is provided with a hole 11 through which passes a round rod 12. A forked member 13 is fastened to the lower end of the rod with its flat upper end engaging the bottom face of the enlargement 2' and a piece 14 is bolted to the upper end of the rod with its lower end engaging the upper shoulder of the enlargement. A handle 15 passes through a hole in the piece 14 and a front wheel 16 is rotatably carried by the forked member 13, said wheel being rotatably mounted on a shaft 17 which passes through the prongs of the fork. The ends of the shaft project from the member and are threaded to receive the small pieces of pipe 18 which act as foot rests. The parts 12, 13 and 14 act as a steering post for the device and this post is rotatably mounted in the bar 2 and is held against longitudinal movement by the ends of the pieces 13 and 14 engaging the flat faces of the enlargement 2'.

From the above it will be seen that I have produced a simple and inexpensive toy upon which a child can sit and propel himself along with his feet. When coasting down a hill the child can place his feet upon the rests 18. The tapered extension 6 acts as a handle for actuating the device when it is occupied by an infant. By making the parts adjustable the length and height of the device can be changed to suit children of different ages.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a seat part, a front bar to which the seat part is adjustably connected, a steering post carried by the front bar, a wheel carried by the steering post, a bracket connected with the under face of the seat part and having a curved tapered extension at its rear, depending pieces connected with the bracket and a rear wheel rotatably connected with said pieces.

In testimony whereof I affix my signature.

ARTHUR R. FIREHAMMER.